Feb. 3, 1925.

F. J. MANSEAU 1,524,796

DUMPING SCALE

Filed July 22, 1922

Inventor
Frederick J. Manseau

By Herbert E. Smith
Attorney

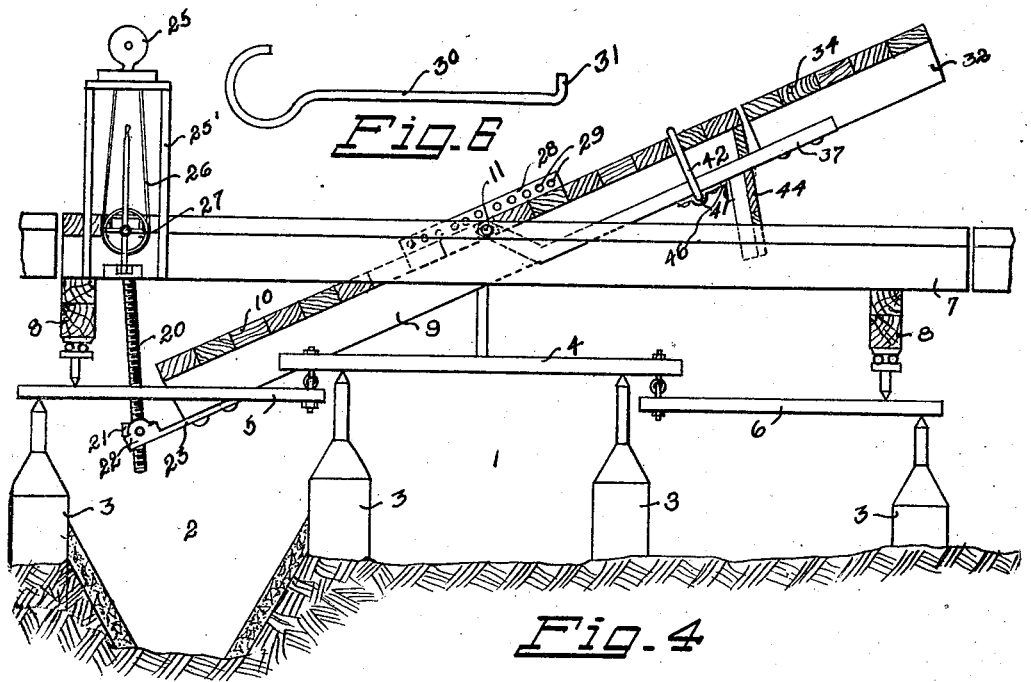
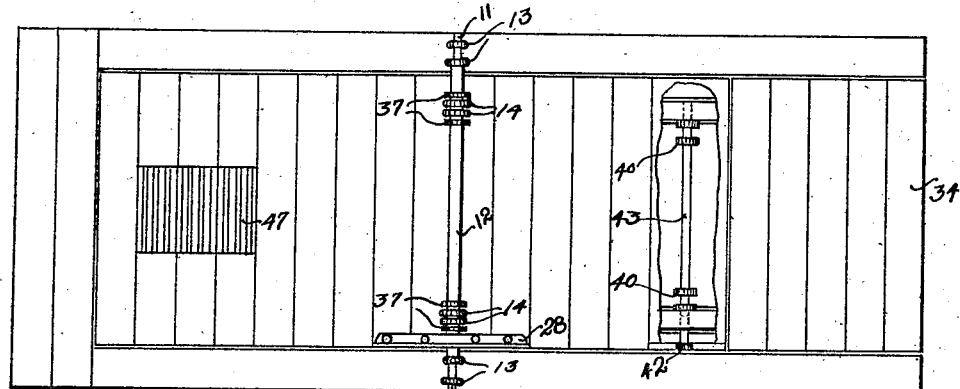
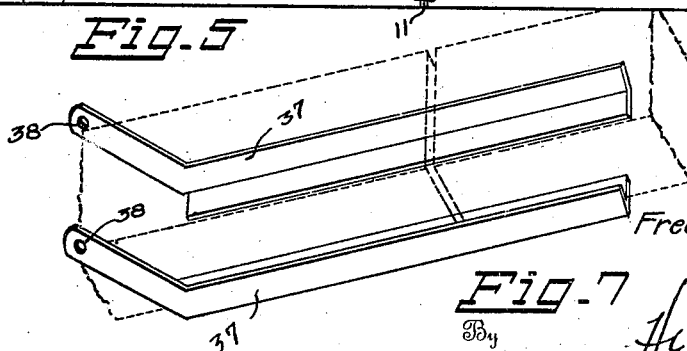

Patented Feb. 3, 1925.

1,524,796

UNITED STATES PATENT OFFICE.

FREDRICK J. MANSEAU, OF CLARKSTON, WASHINGTON.

DUMPING SCALE.

Application filed July 22, 1922. Serial No. 576,901.

*To all whom it may concern:*

Be it known that I, FREDRICK J. MANSEAU, a citizen of the United States, residing at Clarkston, in the county of Asotin and State of Washington, have invented certain new and useful Improvements in Dumping Scales, of which the following is a specification.

My present invention relates to improvements in dumping scales of the platform type, whereby the commodity may be weighed and then dumped into a waiting receptacle, while the carrier remains on the scale platform. While applicable for numerous uses, the invention is designed especially for use in connection with the weighing of grain when contained in wagons or automotive vehicles, and is so constructed that after the tare weight has been ascertained, the contents may be emptied from the vehicle, while the latter remains on the scale platform, and then the vehicle or carrier may be weighed to ascertain the net weight of the commodity.

In the embodiment of my invention a tiltable platform is utilized, which platform is furnished with an extension for adapting the platform to vehicles of longer wheel base thus providing means for weighing either a wagon or automotive truck. In its construction a minimum number of parts are required for the platform thus reducing the cost of construction and permitting facile operation of the movable parts, and the platform as embodied and illustrated in the accompanying drawings is rendered strong and durable. The invention consists in certain novel combinations and arrangements of parts as will be hereinafter more specifically set forth and claimed.

In the accompanying drawings I have illustrated one complete example of the physical embodiment of my invention wherein the parts are combined and arranged according to the best mode I have thus far devised for the practical application of the principles of my invention.

Figure 4 is a view similar to Figure 1, but showing the pivoted section of the dumping platform rigidly connected therewith, as when accommodating a truck or other similar vehicle.

Figure 5 is a plan view of the platform, part being broken away for convenience of illustration.

Figure 6 is a detail view of one of the hooks utilized to couple the wheels of the vehicle to the dumping platform when the latter is tilted.

Figure 7 is a perspective view showing the pair of angle irons or straps for pivotally connecting the extension platform section to the main tilting platform.

Figure 1:
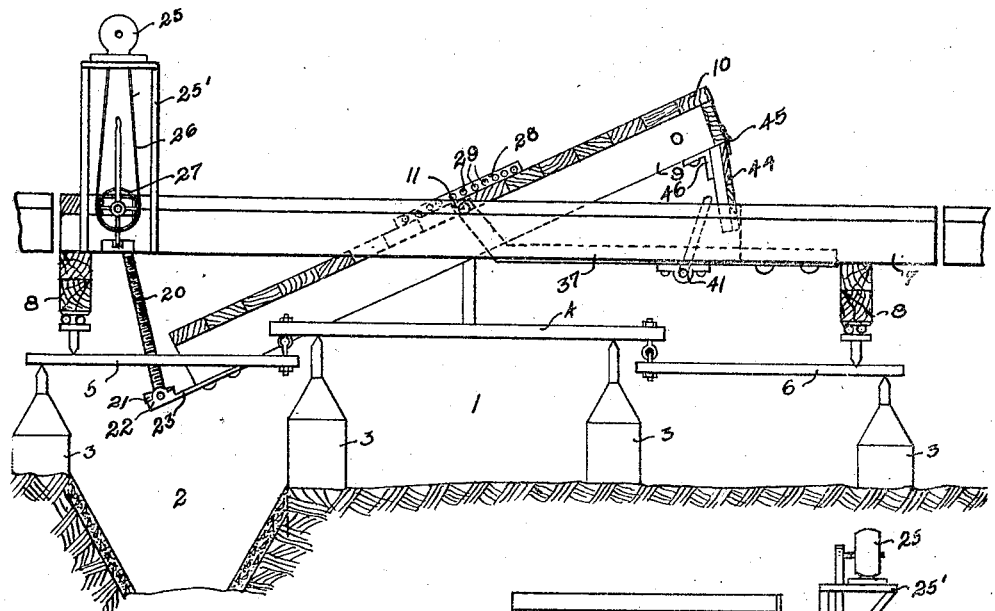
Figure 1 is a view in side elevation, with parts in section, showing the platform in dumping position and adapted to accommodate a wagon or vehicle with short wheel base.
Figure 2:
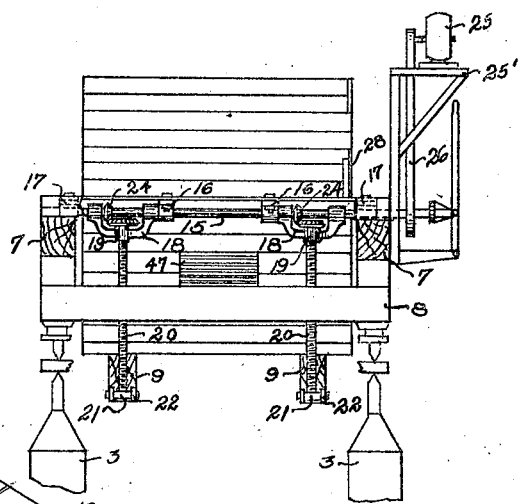
Figure 2 is an end elevation of the structure of Figure 1.

The structure of the invention is built or installed over the usual pit 1 in which a bin or other receptacle 2 is provided to receive the grain or other commodity as it is dumped or emptied from the vehicle or carrier containing the commodity to be weighed.

The usual piers 3 are located at proper places to support the operating parts of the scale mechanism, and the intermediate supporting beam 4 and scale levers 5 and 6 are connected with usual or suitable indicating devices for ascertaining the weight of the load.

The main platform scale is buoyantly supported on the scale levers, and is of rectangular shape including a pair of longitudinal side sills 7, and cross beams 8 at the ends thereof to form a rigid structure. Within the main platform the tiltable platform is supported, and the latter comprises longitudinal side sills 9 and the planks or boards 10, all preferably of wood and properly secured together to afford a rigid and strong structure. The main tilting platform is pivotally supported in the frame from the side sills 7 by means of a transverse or cross bar 11, over which U-bolts 13 are attached and secured in the side sills 7. Similar U-bolts 14 are secured in the sills of the main tilting platform, as sills 9, and pass around the pipe 12, and it will be apparent that the main tilting platform as thus suspended or supported from the cross bar, may swing or oscillate by its hangers 14 on said pipe to permit tilting of the platform as indicated. At the same time side movement or thrust is prevented as the ends of pipe 12 rest against the inner set of U-bolts on the main frame.

The tilting platform is thus pivotally supported intermediate of its ends, and in addition it is suspended and positively supported at one end as from a transverse shaft 15 which is supported from the main frame of the platform by hangers 16 and bearings 17.

By means of a pair of swinging yokes or frames 18 that are suspended from the shaft 15 the tilting platform is suspended, and for this purpose the swinging yokes have bearing sleeves 19 in which a pair of screw bars 20 are loosely journaled. The swinging yokes and screw bars are spaced apart equidistant from the center of the shaft 15 and hang from the shaft so that the yokes may swing on the shaft and the screw bars be turned in their bearings on the yokes. Each screw bar is provided with a nut 21, which has a swiveled bearing, as on trunnions, at 22, in a suspending plate 23, and each of these plates is rigidly secured, as by bolts, to one of the side sills 9 of the tilting frame. It will thus be apparent that the tilting platform may be oscillated on its pivot bar 12, and the flexible connection between the sills of the tilting platform and the suspending shaft will permit the platform, when tilted, to swing on its pivot shaft.

The screw bars are revolved from the shaft 15 by a pair of bevel gear trains 24 between the shaft and screw bars, and the shaft is revolved from a motor 25 supported on the motor frame 25' erected upon and attached to the main platform of the scale. By means of a belt 26 from the motor and suitable driving wheel, the wheel 27 on the shaft is driven, to revolve the shaft either for lowering the tiltable platform to dumping position as shown, or for elevating the tilted platform to its normal horizontal position.

For weighing the contents of a wagon, the horses are driven on the platform with the wagon standing on the main tilting frame, and the wheels of the wagon are secured and held stationary by means of an angle iron 28, at one side of the tiltable platform. This plate is provided with a series of perforations 29, and a wheel hook 30 is fashioned with end lug 31 to engage a selected perforation. Thus, after the wagon has been properly located, the hook 30 is anchored in the appropriate perforation in the side plate and the hook is engaged around the spoke or rim of the wheel to rigidly hold the vehicle with relation to the tiltable platform.

For the accommodation of vehicles of longer wheel base, as automotive vehicles, I provide the tilting platform with a pivoted extension platform complementary thereto. This extension platform includes short side sills 32, with the cross planks or boards 34 nailed or bolted thereto, and the parts are suitably braded to form a rigid structure.

Figure 3:
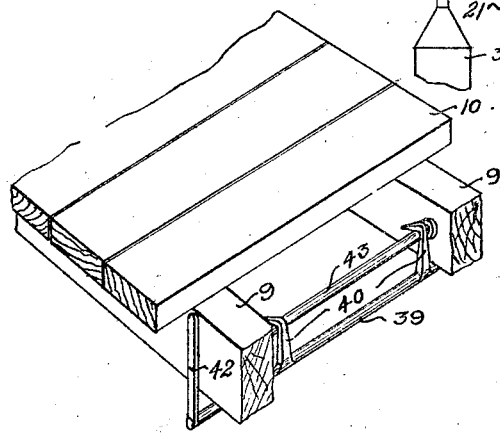
Figure 3 is an enlarged, sectional, perspective view, showing the means for locking the pivoted section of the dumping platform to the main dumping section.

At its inner end, the extension platform is coupled with the pivot bar 12 of the tilting platform by a pair of angle iron straps 37, 37 each fashioned with an upwardly bent and perforated end lug 38 that is loosely journaled on pipe 12'. These straps are spaced at the sides of the extension platform and are bolted at the outer lower corners of the side sills 32, and the straps and sills 32, when the extension platform is in horizontal position, rest upon the cross beams 8 of the main frame of the scales. When a truck is to be weighed on the scales, this extension platform is rigidly secured to and tilts bodily with the tilting platform, and to make this rigid connection between the parts or platform sections I utilize a rock shaft 39 having a pair of upright hooks 40 spaced a suitable distance apart. The rock shaft is journaled in bearings or brackets 41 bolted to the under side of the two straps 37, and the rock shaft extends transversely of the tilting frame and below it. By means of a hand lever 42 at either end of the rock shaft the shaft may be rocked or turned to engage the hooks 40 over a fixed, transversely extending bar 43 supported in and passing through the sills of the main tilting frame. By means of the hooks and bar 43, the two sections of the tilting frame are coupled as indicated in Figure 3 and then adapted to oscillate or swing bodily on the pivotal support or bar 12.

As a guard for the hind legs and hoofs of the horses as they stand upon the extension platform I provide a transversely disposed guard member or shield 44, made of one or more planks or boards, and hinged at 45 to an end of the main tilting platform between the two sections of the tilting platform. The guard is adapted to hang as indicated in Figures 1 and 4 and may rest against stops or braces 46, fixed to the main tilting section or platform. In the position of Figure 1 the guard is designed to close the gap between the tilted platform and the horizontal extension platform upon which the horses stand, thus eliminating danger of the horses backing into the gap between these parts.

In the main section of the tilting platform a grated opening 47 is provided, through which the grain passes when it is dumped or emptied from the wagon or truck, and this closure may be removed, if desired, to gain access to the pit.

The operation of the apparatus will be obvious, and it will be understood that after the horses and wagon, or truck, have been driven onto the tiltable platform, the tare weight is ascertained, after the vehicle has been secured to the tiltable platform. After the tare weight has been indicated, the motor is operated and the tiltable platform is tilted to position of either Figure 1 or Figure 3. The contents of the vehicle are then discharged or emptied, the tiltable platform is restored to horizontal position, and the weight of the vehicle is then ascertained in order that the net weight may be computed. In this manner the contents of the vehicle may be quickly weighed and emptied, and the vehicle then removed from the scales, to give way to a succeeding vehicle, thus expediting the operation of weighing and storing the commodity. The structure as thus embodied provides a strong, compact, and well braced support for the tilting operations and for the load, that may be manipulated with convenience and facility.

Having thus fully described my invention, what I claim as new and desire to secure by Letters Patent is:—

1. The combination with a tiltable platform having longitudinal sills, and a supporting bar, of an extension platform, spaced angle iron straps secured to the extension platform adapted to engage under said sills and pivotally connected with said bar, and co-acting means on said platforms for rigidly coupling them together to insure bodily tilting movement.

2. The combination with a tiltable platform having longitudinal sills and a supporting bar for the platform, of an extension platform, spaced angular straps on the extension platform adapted to engage under said sills and having a pivotal connection on said bar, a transverse rock shaft on the extension platform, a cross bar fixed in said sills, and hooks on the rock shaft to engage said cross bar.

In testimony whereof I affix my signature.

FREDRICK J. MANSEAU.